US007712226B1

(12) United States Patent
Stearns

(10) Patent No.: US 7,712,226 B1
(45) Date of Patent: May 11, 2010

(54) GRID SYSTEM APPARATUS

(76) Inventor: David R. Stearns, 4471 Lexington Ct., Hudsonville, MI (US) 49426

( * ) Notice: Subject to any disclaimer, the term of this patent is extended or adjusted under 35 U.S.C. 154(b) by 0 days.

(21) Appl. No.: 11/903,524

(22) Filed: Sep. 21, 2007

(51) Int. Cl.
*G01B 3/14* (2006.01)
*B43L 7/00* (2006.01)

(52) U.S. Cl. .......................... 33/566; 33/563; 434/408; 434/416

(58) Field of Classification Search .................. 33/563, 33/565, 566, DIG. 1; 434/87, 416, 418, 430, 434/408, 409, 410; 248/441.1
See application file for complete search history.

(56) References Cited

U.S. PATENT DOCUMENTS 723,022 A * 3/1903 Pratt .......................... 434/416
2,090,186 A * 8/1937 Corbett ........................ 434/87
2,595,142 A * 4/1952 Herck ......................... 33/562
3,135,059 A * 6/1964 Barish ........................ 434/410
3,336,682 A * 8/1967 Genin ........................ 434/416
3,376,650 A * 4/1968 Cook .......................... 33/566
3,557,463 A * 1/1971 Perry et al. .................. 33/565
3,844,049 A * 10/1974 Suvada ........................ 434/90
4,217,379 A * 8/1980 Salvador ...................... 33/758
4,828,502 A * 5/1989 Leahy ........................ 434/416
5,698,297 A * 12/1997 Pitts et al. .................... 434/90
6,219,930 B1 * 4/2001 Reid ........................... 33/566
6,506,058 B1 * 1/2003 Frances ...................... 434/408
6,568,938 B1 * 5/2003 Prince et al. .................. 434/90
6,579,099 B1 * 6/2003 Pipes, Jr. ..................... 434/85
6,729,035 B1 * 5/2004 Carrillo ....................... 33/566
6,760,978 B2 * 7/2004 Gleeson ....................... 33/563
6,834,438 B1 * 12/2004 Heister ........................ 33/566
7,251,898 B2 * 8/2007 Schafer et al. ................ 33/566
2003/0115767 A1 * 6/2003 Wedekind et al. ............. 33/566
2003/0162162 A1 * 8/2003 Marggraff ................... 434/410
2005/0237321 A1 * 10/2005 Young et al. .................. 434/90
2006/0003307 A1 * 1/2006 Hester et al. ................ 434/408
2006/0008779 A1 * 1/2006 Shand et al. .................. 434/90
2007/0059677 A1 * 3/2007 Gerhardt ..................... 434/408
2007/0094904 A1 * 5/2007 Frank et al. .................. 40/594
2008/0104867 A1 * 5/2008 McCormack et al. ......... 40/107
2008/0104868 A1 * 5/2008 Drie ............................ 40/110
2008/0274445 A1 * 11/2008 Murakata et al. ............ 434/409
2008/0297595 A1 * 12/2008 Hildebrandt et al. .......... 348/61

FOREIGN PATENT DOCUMENTS

GB 2115374 A * 9/1983 .................. 33/563
GB 2246541 A * 2/1992 .................. 33/566
JP 1-226396 A * 11/1989 ................. 434/416

* cited by examiner

*Primary Examiner*—G. Bradley Bennett
(74) *Attorney, Agent, or Firm*—Jovan N. Jovanovic; Vladon M. Vasiljevic; The Watson I.P. Group, PLC

(57) ABSTRACT

A grid system apparatus comprising a substantially planar base member and an attachment member. The base member has an upper surface and a lower surface opposite of the upper surface. The attachment member is mounted to the lower surface of the base and is compatible with the lower surface of the base which facilitates releasable attachment of the base member to an outside surface. The base member and the attachment member are configured as a plurality of border members which cooperate to define a plurality of voids therebetween. The border members include a plurality of outer border members defining an outer periphery thereof, and a plurality of inner border members defining the plurality of voids. The outer border members and the inner border members interface at intersection regions.

20 Claims, 3 Drawing Sheets

GRID SYSTEM APPARATUS

BACKGROUND OF THE INVENTION

1. Field of the Invention

The invention relates in general to a grid system apparatus, and more particularly, to a grid system apparatus which is coupled to display boards, such as a whiteboard, or other outside writing surface.

2. Background Art

The use of large charts and graphs is ubiquitous in today's office environment. Specifically, large display boards, often termed whiteboards, are utilized to display information during presentations and otherwise. Often these large display boards are placed in large conference rooms, collaboration areas and/or shared regions of the office.

In many instances it is necessary to create grids to display information commonly formatted in cells much like a spreadsheet. Often, strips of tape are utilized in a rudimentary fashion to form a plurality of cells of a grid. In other instances, lines are drawn with a ruler or other straight edge. In either instance, the exercise of forming a grid is a labor intensive effort. It is often difficult to create a uniform grid without undue effort. With the latter solution, it becomes difficult to erase portions of the cells or entire cells without disrupting the grid, as the two are generally drawn with the same type of marker (i.e., dry erase, or the like).

It is an object of the present invention to provide an effective solution for creating grids having cells on display boards, such as whiteboards.

It is another object of the present invention to provide grids which can be cut or otherwise modified to modify the size of individual cells of the grid.

These objects as well as other objects of the present invention will become apparent in light of the present specification, claims, and drawings.

SUMMARY OF THE INVENTION

The invention is directed to a grid system apparatus comprising a base member and an attachment member. The base member comprises a substantially planar base member having an upper surface and a lower surface opposite of the upper surface. The attachment member is mounted to the lower surface of the base. The attachment member is compatible with the lower surface of the base member and facilitates releasable attachment of the base member to an outside surface. The base member and the attachment member are configured as a plurality of border members which cooperate to define a plurality of voids therebetween. The border members include a plurality of outer border members defining an outer periphery thereof, and a plurality of inner border members. The outer and inner border members define the plurality of voids. The outer border members and the inner border members interface at intersection regions.

In a preferred embodiment, the substantially planar base member comprises one of a vinyl member and a polypropylene member.

In one such preferred embodiment, the attachment member comprises an adhesive layer which is compatible with the base member and with an outside surface.

In a preferred embodiment, the attachment member comprises an adhesively coupled magnetic member. In one embodiment, the magnetic member is coextensive with the bottom surface of the base member.

Preferably, the grid system further comprises a plurality of perforations proximate the intersection regions. The perforations facilitate the detachment of any one of the outer border members and inner border members at that intersection region.

In another preferred embodiment, the base member is compatible with a writing implement to, in turn, facilitate the receipt of indicia thereon.

In one embodiment, the voids comprise substantially rectangular geometric configurations. In another embodiment, the voids comprise one of the group consisting of: square, triangular, isometric, circular, and elliptical geometric configuration.

In another aspect of the invention, the invention discloses a method of using a grid system apparatus comprising the steps of: providing an outside surface; providing a grid system apparatus; applying the grid system apparatus to the outside surface by way of the attachment member; and positioning at least one of an outside object and indicia onto the outside surface within the confines of one of the plurality of voids.

In a preferred embodiment, the method further comprises the steps of removing at least one of the inner border members and the outer border members to, in turn, join adjoining voids.

In one such embodiment, the step of removing comprises the step of cutting at least one of the inner border members and outer border members proximate each intersection region to, in turn, remove the respective one of the inner border member and the outer border member.

In another preferred embodiment, each intersection region includes a perforation extending across the respective inner border member and outer border member with which it is associated. In such an embodiment, the step of removing further comprises the step of detaching the respective border member at the respective perforation associated therewith.

In another embodiment, the method further comprises the step of applying indicia to at least one of the inner border member and the outer border members.

In another preferred embodiment, the method comprises the step of removing the grid system apparatus from the outside surface.

Preferably, the outside surface comprises one of a whiteboard, a magnetic writing board and a chalkboard.

BRIEF DESCRIPTION OF THE DRAWINGS

The invention will now be described with reference to the drawings wherein.

DETAILED DESCRIPTION OF THE INVENTION

Figure 1:
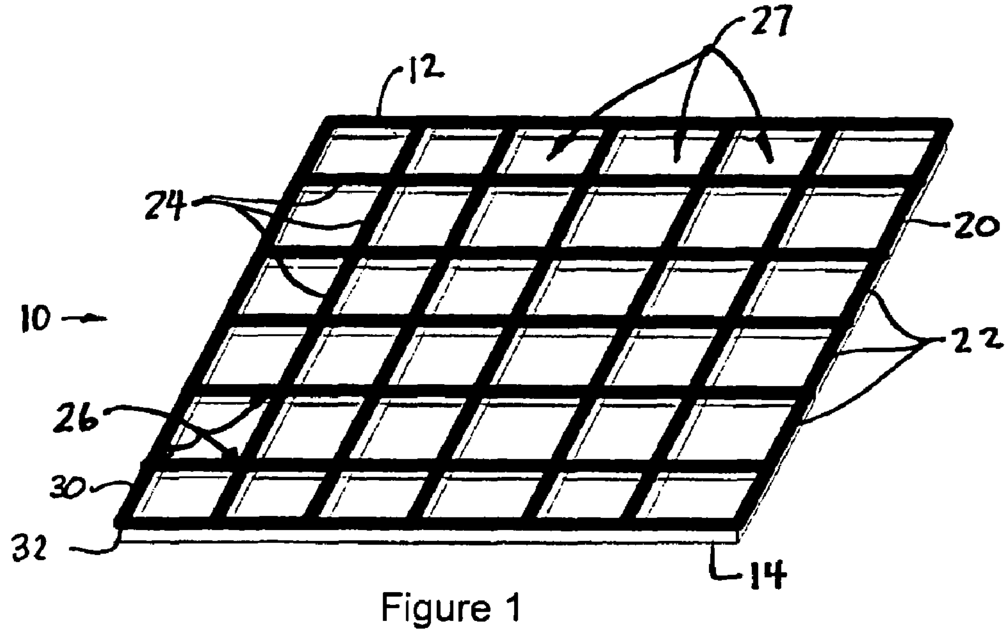
FIG. 1 of the drawings is a perspective view of an embodiment of the grid system apparatus of the present invention.

While this invention is susceptible of embodiment in many different forms, there is shown in the drawings and described herein in detail a specific embodiment with the understanding that the present disclosure is to be considered as an exemplification of the principles of the invention and is not intended to limit the invention to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the grid system apparatus is shown generally at 10. The grid system apparatus is configured for application and use in association with a display board 100 (FIG. 4) such as a whiteboard, a magnetic whiteboard, a chalkboard, or other type of large writing surface, for example, utilized during presentations to larger groups of individuals. In certain embodiments, the grid system is configured for use in association with a paperboard outside surface, however, one advantage of the system is that it is in many respects reusable and can, in many instances, be removed from the outside surface. Of course, the invention is not limited to the particular outside surface with which it is utilized.

Referring again to FIG. 1, the grid system apparatus 10 comprises a base member 12 and an attachment member 14. The base member 12 includes upper surface 30 and lower surface 32. Generally, the base member comprises a polymer material, such as, for example, and without limitation, a polypropylene or a vinyl member, preferably, which is of a color that contrasts with the underlying outside surface with which it is utilized. In one embodiment, the base member comprises a blue or a black member. Of course, it is not limited to such colors, or to a single uniform color. Additionally, certain embodiments may comprise translucent or transparent base members. While various thicknesses are contemplated, in a preferred embodiment, the base member is approximately 5 to 30 mils in thickness. Of course, other thicknesses are contemplated.

Figure 3:
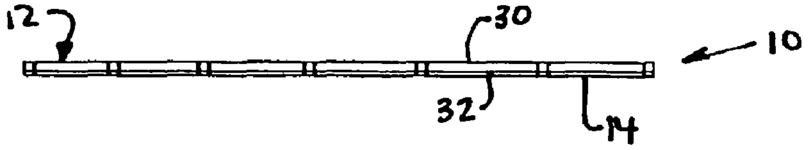
FIG. 3 of the drawings is a cross-sectional view of an embodiment of the grid system apparatus of the present invention shown in FIG. 2, taken generally about lines 3-3 of FIG. 2.

Attachment member 14 is shown in FIGS. 1 and 3 as comprising a layer of material applied to the lower surface 32 of the base member. In one embodiment, the attachment member comprises an adhesive layer that is applied to the lower surface of the base member. The adhesive layer is compatible with each of the base member and the outside surface. Wherein the grid system apparatus is removable, the adhesive layer is such that it adheres to the base member, while being releasably attachable to the outside surface, such that it can be removed from the outside surface with minimal retention of adhesive or residue by the outside surface.

The adhesive is preferably applied to the entirety of the lower surface of the base member. In certain embodiments, it may be desirable to apply the adhesive to only portions of the lower surface. In such an embodiment, it remains preferable that the adhesive is applied to the regions of the base member immediately surrounding a void, to enhance the edge adhesion of the base member to the outside surface. Additionally, a release material layer 51 (FIG. 4) may be positioned over the adhesive layer, prior to use thereof. A user can release this layer to expose the adhesive layer thereunder.

In another embodiment, the attachment member comprises a magnetic member which is coupled to the lower surface 32 of the base member. The magnetic member typically comprises a ferrite material which is captured within a rubber or polymer substrate or matrix. In this manner, the resulting material has some flexibility and typically minimizes scratching of the outer surface. The magnetic material is likewise desirously positioned so as to be coextensive with the lower surface of the base member. Of course, while coextensiveness is not required, the ability of the magnetic member to be coupled to an outside surface that is metallic is directly related to the quantity of magnetic material and the weight of the overall grid system apparatus.

Figure 2:
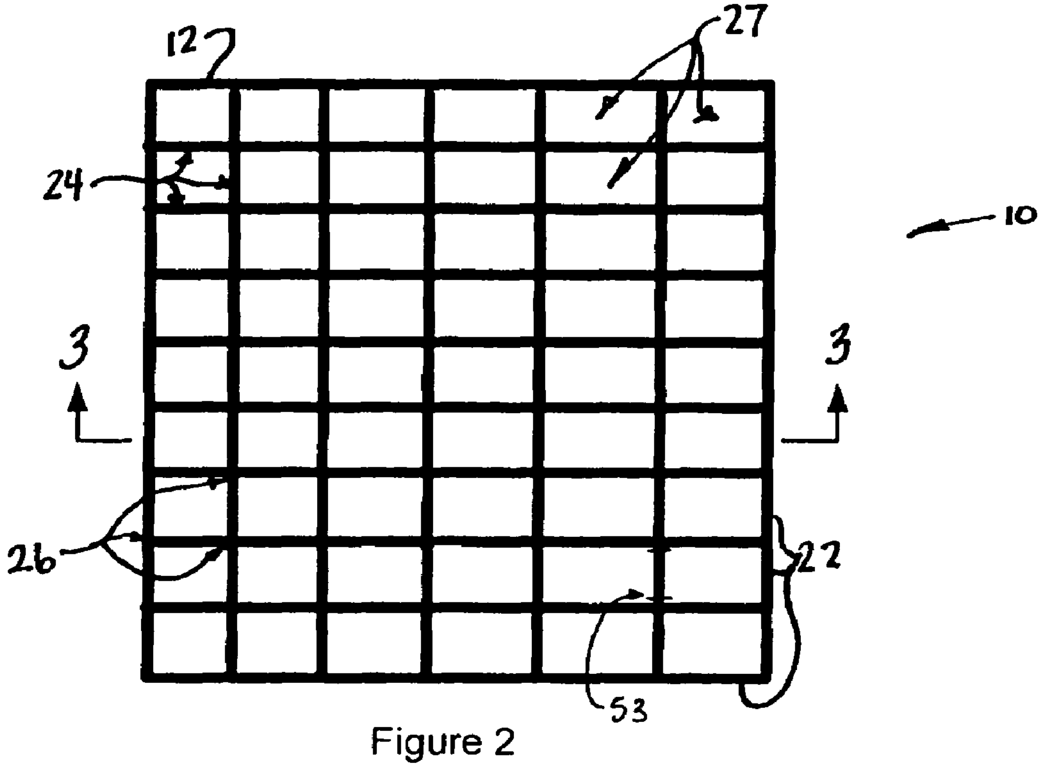
FIG. 2 of the drawings is a top plan view of an embodiment of the grid system apparatus of the present invention.

With respect to configuration, the grid system apparatus is shown in FIGS. 1 through 3 as including a plurality of border members 20 which include outer border members 22 and inner border members 24. The various border members intersect, meet and/or terminate at intersection regions, such as intersection region 26. The border members cooperate to define a plurality of voids, such as void 27. In the embodiment shown in FIGS. 1 through 3, the voids comprise a plurality of rectangular configurations, each one of which is formed by four border members (in certain instances four inner border members; three inner border members and one outer border member; or two inner border members and two outer border members).

While not required, in the embodiment shown, each of the border members are substantially identical in width. All of the horizontally disposed border members are substantially identical in length, and all of the vertically disposed border members are substantially identical in length (but shorter than the horizontally disposed border members). Thus, substantially identical voids of a rectangular geometric configuration are disclosed.

Of course, in other embodiments, such as the embodiments of FIGS. **5*a* through 5*d***, a number of differently configured outer and inner border members is shown, and a number of different voids having different void geometries are contemplated. Additionally, a single grid system apparatus may have a plurality of voids of different void geometries.

In one embodiment, as is shown in FIG. 2, perforations 53 may be disposed along one or more of the border members, to facilitate detachment thereof from the remainder of the grid system apparatus. In one embodiment, each end of each of the border members may include perforations, such that the intersection region is substantially surrounded by perforations. In other embodiments, the borders may be contiguous and integrally molded, wherein individual borders can be removed by way of a cutting implement, such as a knife or a pair of scissors.

Figure 4:
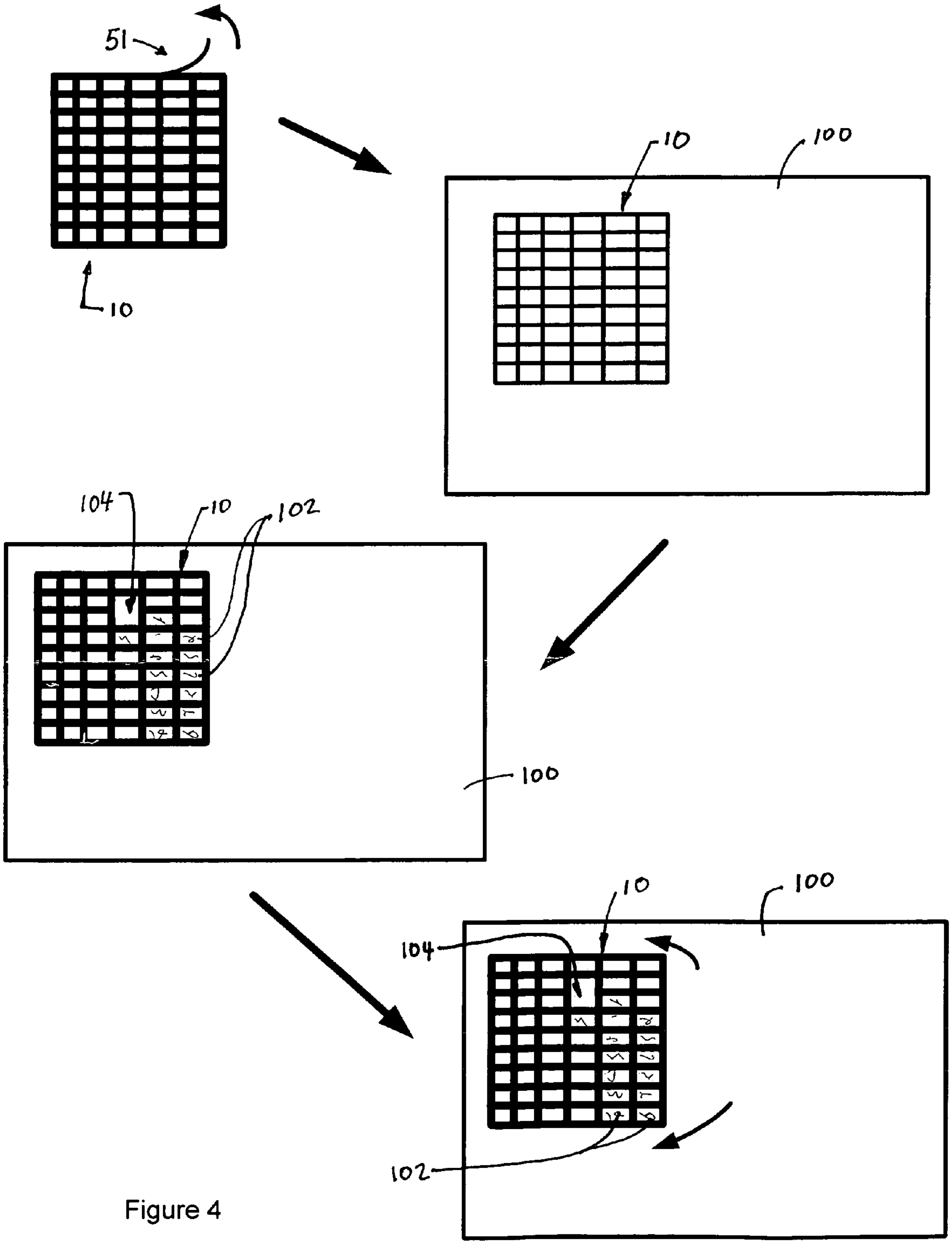
FIG. 4 of the drawings is a sequential schematic representation of the application of the grid system apparatus of the present invention to an outside surface and removal thereof.
Figure 5A:
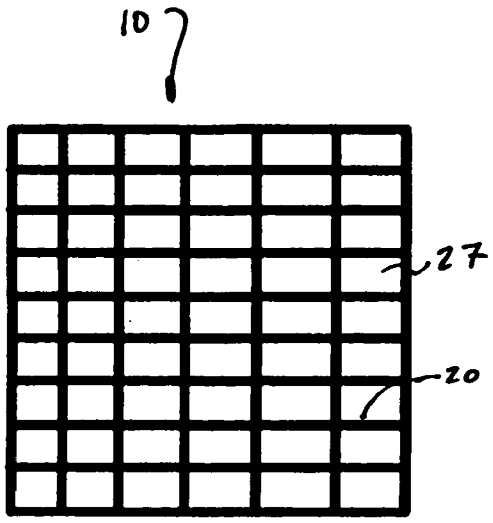
FIGS. 5*a* through 5*d* comprise a plurality of differently shaped voids, which are solely exemplary and not limiting.
Figure 5B:
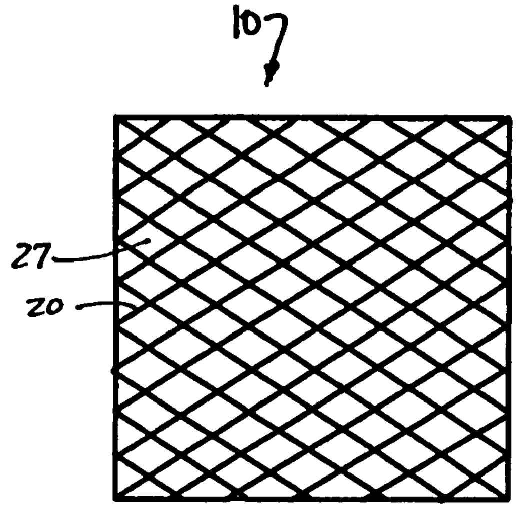
Figure 5C:
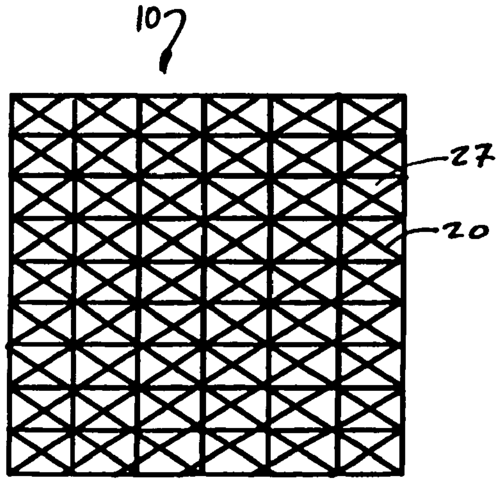
Figure 5D:
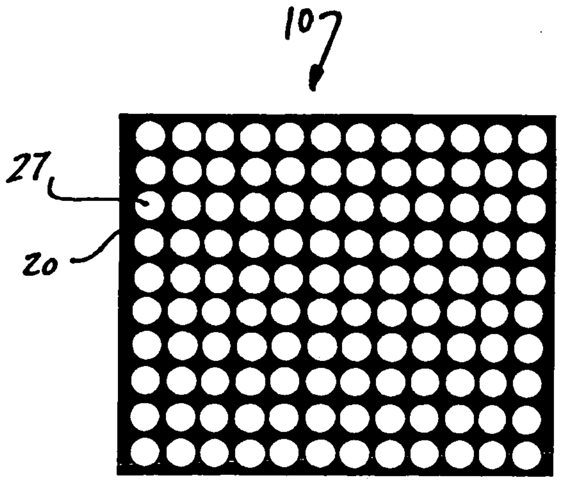

The use of the grid system apparatus is shown in FIG. 4. Specifically, in use, the user first determines the outside surface to which the grid system apparatus is to be coupled. In the embodiment wherein the attachment member comprises an adhesive layer, the user can remove a release layer 51, or otherwise expose or activate the adhesive layer. Once the adhesive layer is readied, the user can apply the grid system apparatus to the outside surface 100, such that the adhesive layer comes into contact with the outside surface 100. Wherein the attachment member comprises a magnetic member (and the outside surface is compatible therewith), the user can merely bring the two surfaces into close association at which time the magnetic member and the outside surface will be attracted to each other.

Once attached, the user can write upon, or place items within the outside surface that is captured within any one of the voids. Indeed, the apparatus provides an instant grid on the outside surface which can then be used to separate various indicia 102 (FIG. 4). In certain embodiments, it may be desirable to apply indicia directly to the various outer border members or inner border members. The upper surface of the base member is configured to receive indicia in the form of a marker, pencil, pen, crayon, grease pencil, among other indicia applying implements.

At times, it may become necessary to increase the size of a void, or to otherwise combine voids. In such an instance, the user can cut various ones of the outer border members and/or inner border members (or portions thereof) so as to combine the various voids. In one instance, a vertical inner border member can be removed so as to render a void that is of more than double width with the same height as adjoining voids. In another instance, a horizontal inner border member can be cut so as to create a void 104 (FIG. 4) that is greater than double height, while maintaining the same width of other voids. Such cuts can be obtained through the use of a knife blade, or another cutting implement, such as a pair of scissors. Where the base member includes perforations, the user may be able to rip various border members without a separate tool, or the perforations can be used as a guide for a cutting implement.

Once the user has completed its use, the user can maintain the grid system apparatus attached to the outside surface 100. In other embodiments, it may be desirable to reuse the apparatus. As such, the user can remove the apparatus from the outside surface and subsequently place it on another outside surface as desired.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A wall mountable grid system apparatus for forming a spreadsheet having cells together with an underlying wall structure, the grid system comprising:

a substantially planar base member having an upper surface and a lower surface opposite of the upper surface, an attachment member mounted to the lower surface of the base, the attachment member compatible with the lower surface of the base, to facilitate releasable attachment of the base member to an outside surface; and the base member and the attachment member configured as a plurality of integrated border members which cooperate to define a plurality of voids therebetween, exposing the underlying wall structure, the border members comprising a plurality of outer border members defining an outer periphery thereof, and a plurality of inner border members defining the plurality of voids, the outer border members and the inner border members interfacing at intersection regions, to in turn, provide a framework of a spreadsheet on a wall structure, with the wall structure exposed within the voids, and the voids are structurally sized so as to be usable as cells of a spreadsheet, with the border members forming the border of the cells.

2. The grid system apparatus of claim 1 wherein the substantially planar base member comprises one of a vinyl member and a polypropylene member.

3. The grid system apparatus of claim 2 wherein the attachment member comprises an adhesive layer which is compatible with the base member and with an outside surface.

4. The grid system apparatus of claim 2 wherein the attachment member comprises an adhesively coupled magnetic member.

5. The grid system of claim 4 wherein the magnetic member is coextensive with the bottom surface of the base member.

6. The grid system of claim 1 further comprising a plurality of perforations proximate the intersection regions, to facilitate the detachment of any one of the outer border members and inner border members thereat.

7. The grid system of claim 1 wherein the base member is compatible with a writing implement to, in turn, facilitate the receipt of indicia thereon.

8. The grid system of claim 1 wherein the voids comprise substantially rectangular geometric configurations.

9. The grid system of claim 1 wherein the voids comprise one of the group consisting of: square, triangular, isometric, circular, and elliptical geometric configuration.

10. A method of using a wall mountable grid system apparatus for forming a spreadsheet having cells together with an underlying wall structure, the method comprising the steps of:

providing an outside surface, wherein the outside surface comprises a wall structure;

providing a grid system apparatus comprising:

a substantially planar base member having an upper surface and a lower surface opposite of the upper surface; and the base member configured as a plurality of border members which cooperate to define a plurality of voids therebetween, exposing the underlying wall structure, the border members comprising a plurality of outer border members defining an outer periphery thereof, and a plurality of inner border members defining the plurality of voids, the outer border members and the inner border members interfacing at intersection regions;

attaching the grid system apparatus to the underlying wall structure, to in turn, provide a framework of a spreadsheet on the wall structure, with the wall structure exposed within the voids, and the voids are structurally sized so as to be usable as cells of a spreadsheet with the border members forming the border of the cells; and positioning at least one of an outside object and indicia onto the wall structure within the confines of one of the plurality of voids, to, in turn, utilize the wall mountable grid system together with the underlying wall structure as a spreadsheet having a plurality of cells.

11. The method of claim 10 further comprising the step of: removing at least one of the inner border members and the outer border members to, in turn, join adjoining voids.

12. The method of claim 11 wherein the step of removing comprises the step of cutting at least one of the inner border members and outer border members proximate each intersection region to, in turn, remove the respective one of the inner border member and the outer border member.

13. The method of claim 11 wherein each intersection region includes a perforation extending across the respective inner border member and outer border member with which it is associated, the step of removing further comprising the step of detaching the respective border member at the respective perforation associated therewith.

14. The method of claim 10 further comprising the step of applying indicia to at least one of the inner border member and the outer border members.

15. The method of claim 10 further comprising the step of removing the grid system apparatus from the outside surface.

16. The method of claim 10 wherein the underlying wall surface comprises one of a whiteboard, a magnetic writing board and a chalkboard.

17. A combination wall and grid system comprising:

a wall structure comprising one of a whiteboard, a magnetic writing board and a chalkboard;

a grid system attached to the wall structure, the grid system comprising:

a substantially planar base member having an upper surface and a lower surface opposite of the upper surface; and the base member and the attachment member configured as a plurality of integrated border members which cooperate to define a plurality of voids therebetween, exposing the underlying wall structure, the border members comprising a plurality of outer border members defining an outer periphery thereof, and a plurality of inner border members defining the plurality of voids, the outer border members and the inner border members interfacing at intersection regions, to in turn, provide a framework of a spreadsheet on a wall structure, with the wall structure exposed within the voids, and the voids are structurally sized so as to be usable as cells of a spreadsheet, with the border members forming the border of the cells.

18. The grid system apparatus of claim 17 wherein the substantially planar base member comprises one of a vinyl member and a polypropylene member.

19. The grid system apparatus of claim 18 wherein the attachment member comprises an adhesive layer which is compatible with the base member and with an outside surface.

20. The grid system apparatus of claim 18 wherein the attachment member comprises an adhesively coupled magnetic member.

* * * * *